United States Patent
Shimizu et al.

(10) Patent No.: US 6,235,348 B1
(45) Date of Patent: May 22, 2001

(54) RUST PREVENTION

(75) Inventors: Toshihide Shimizu, Urayasu; Mikio Watanabe, Ibaraki-ken; Tamaki Iida, Kiyose, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/310,153

(22) Filed: May 12, 1999

(30) Foreign Application Priority Data

May 13, 1998 (JP) .................................................. 10-148317
May 28, 1998 (JP) .................................................. 10-164332

(51) Int. Cl.[7] ...................................................... B05D 3/02
(52) U.S. Cl. .................................... 427/388.1; 427/397.7; 427/397.8; 427/406
(58) Field of Search .............................. 106/14.42, 14.44; 427/98, 406, 409, 397.7, 397.8, 388.1

(56) References Cited

U.S. PATENT DOCUMENTS

| 1,949,914 | * | 3/1934 | Larson | 427/397.8 |
| 5,068,134 | * | 11/1991 | Cole et al. | 427/397.8 |
| 5,672,390 | * | 9/1997 | Crews, IV et al. | 427/397.8 |
| 5,700,523 | * | 12/1997 | Petrole et al. | 427/397.8 |

FOREIGN PATENT DOCUMENTS

| 317306 | * | 5/1989 | (EP) . |
| 0 317 306 | | 5/1989 | (EP) . |
| 0 372 967 | | 6/1990 | (EP) . |
| 0 372 996 | | 6/1990 | (EP) . |
| 372996 | * | 6/1990 | (EP) . |
| 0 534 434 | | 3/1993 | (EP) . |
| 540934 | * | 5/1993 | (EP) . |
| 0 540 934 | | 5/1993 | (EP) . |
| 0 573 016 | | 12/1993 | (EP) . |
| 331412 | * | 12/1993 | (JP) . |
| 252689 | * | 10/1995 | (JP) . |
| 212474 | * | 9/1997 | (JP) . |
| WO 95/03136 | | 2/1995 | (WO) . |

OTHER PUBLICATIONS

N. Okamoto, et al., Electronics and Communications in Japan, Part 2, vol. 74, No. 1, pps. 105–111, "Composite Films of Conducting Polymer Polyaniline and Silica Gel", 1991.

* cited by examiner

Primary Examiner—Brian K. Talbot
(74) Attorney, Agent, or Firm—Oblon, Spivak, McClelland, Maier & Neustadt, P.C.

(57) ABSTRACT

A rust preventive composition including (a) a silicic acid compound and (b) an aromatic amine-based condensation product is provided, which is effective in preventing a Zn-based metallic coating from rusting. Rusting is prevented by forming a coating film contaning the components (a) and (b) on the surface of the Zn-based metallic coating formed on a base such as a metal plate. The resulting coating film exhibits an excellent corrosion resistance, gives no fear of a health problem such as carcinogensis and provides a desirable black or blackish appearance to a metal surface. In an embodiment wherein a second coating film containing a silicic acid compound is formed on the first coating film, the corrosion resistance is further improved.

13 Claims, No Drawings

RUST PREVENTION

BACKGROUND OF THE INVENTION

1. Field of the Invention

The present invention relates to a method for preventing surfaces of a Zn-based metallic coating from rusting, and a rust preventive. Particularly, it relates to a rust preventive agent and a method for preventing surfaces of a base, such as metallic articles and metallic materials including steel plates used as parts or materials in manufacture of automobiles, building and so forth, coated with a Zn-based metal from rusting.

2. Description of the Prior Art

Plated steel plates, which are used as a material in automobiles, building, etc., such as steel plates plated with zinc or zinc-based alloy are used after painting. The plated steel plates are passed through a variety of steps before being painted; therefore they are left unpainted in the course of these steps for a considerably long time. So, while they are left unpainted, rust is generated or various substances are adsorbed or adheres, on the surfaces of the plated steel plates. As a result, for example, the adhesion of a paint applied in the subsequent step may be poor.

Thus, heretofore, the surfaces of plated steel plates have been subjected to chromate treatment as a primary rust prevention treatment. The corrosion resistance obtained by the chromate treatment is about 48 hours in the salt spray test defined in JIS Z-2371. However, the coating film obtained by the chromate treatment contains hexavalent chromium. It is known that the hexavalent chromium causes an allergy (chromate ulcer) when adhering a skin, and also it is pointed out that the hexavalent chromium is suspected to be a carcinogen (carcinoma cutaneum). So, a primary rust prevention treatment not using hexavalent chromium is required.

Meanwhile, as a primary rust prevention treatment other than the chromate treatment there is proposed a method using a coating agent for metal surfaces, which agent is comprised of carboxyl-modified epoxy resin or polyvinyl butyral resin containing a silica. The use of the coating agent results in a corrosion resistance equivalent to or higher than that obtained by the chromate treatment, but the appearance of the resulting coated metal surface is colorless or metallic. However, it is recently required that the metal surface coated by a primary rust prevention treatment has a black or blackish appearance so as to give a feeling of quality.

SUMMARY OF THE INVENTION

Accordingly, an object of the present invention is to provide a rust preventive and a treating method, suitable as a primary rust prevention treatment, which forms a coating film having a corrosion resistance equivalent to that of the coating film obtained by the chromate treatment, but gives no fear of a health problem such as carcinogenesis and provides a black or blackish appearance to the treated metal surface.

The present inventors have earnestly studied in order to satisfy the above requirements, and as a result, have completed the present invention.

More specifically, the present invention provides a rust preventive for a Zn-based metallic coating, comprising (a) a silicic acid compound and (b) an aromatic amine-based condensation product.

The present invention also provides a method for preventing a Zn-based metallic coating formed on a base from rusting, which comprises forming a coating film (hereinafter, referred to as "first coating film" with respect to the "second coating film" mentioned below) comprising (a) a silicic acid compound and (b) an aromatic amine-based condensation product on the surfaces of the Zn-based metallic coating.

In the above method, preferably a second coating film comprising (a) a silicic acid compound is further formed on the first coating film.

According to the present invention, by forming a coating film comprising a silicic acid compound and an aromatic amine-based condensation product on the surfaces of a Zn-based metallic coating formed on a base such as a metal plate, it can provide a treating method, suitable as a primary rust prevention treatment. The resulting coating film exhibits an excellent corrosion resistance, gives no fear of a health problem such as carcinogenesis suspected in the conventional chromate treatment and provides a black or blackish appearance to the surfaces of the base.

Further by forming a second coating film comprising a silicic acid compound on the first coating film, it is possible to provide a higher corrosion resistance of 100 hours or more in the salt spray test defined in JIS Z-2371.

DETAILED DESCRIPTION OF THE PREFERRED EMBODIMENTS

The present invention will now be described below in more detail.

Firstly, the essential components used in the rust preventive and the method according to the present invention are described.

(a) Silicic Acid Compound

The silicic acid compound used in the present invention is preferably, for example, at least one compound selected from the group consisting of silicic acid esters, colloidal silica and alkali metal silicates.

The silicic acid esters include, for example, alkoxy silane compounds such as tetramethoxysilane, tetraethoxysilane, tetra-n-propoxysilane, tetra-i-propoxysilane, tetra-n-butoxysilane, tetra-i-butoxysilane, tetra-t-butoxysilane, methyltrimethoxysilane, methyltriethoxysilane, methyltri-n-propoxysilane, methyltri-i-propoxysilane, methyltri-n-butoxysilane and methyltri-t-butoxysilane; and condensates of these alkoxysilane compounds.

The condensates of alkoxysilane compounds can be generally produced by partially hydrolyzing the alkoxysilane compound and then condensing the hydrolysis product. The condensates of alkoxysilane compounds include, for example, ethoxypolysiloxane, which is a condensate of tetraethoxysilane, (trade name: "Ethyl silicate-40", produced by Tama Kagaku Kogyo K.K.).

The colloidal silica is a colloid containing super fine particles of silicon dioxide (silica) dispersed in a dispersion medium including an aqueous medium or a non-aqueous medium such as methanol, propanol or ethylene glycol. As typical methods for producing a colloidal silica comprised of colloid particles having a particle diameter of generally 5 to 500 nm, for example, a colloidal silica dispersed in an aqueous medium, there is known a method producing a colloidal silica by adding hydrochloric acid to an aqueous solution of sodium silicate. There is also known a method producing a colloidal silica by adding a small amount of water and ethylamine as a catalyst to silicic acid esters such as tetraethoxysilane in an organic solvent such as isopropylalcohol to subject the silicic acid esters to hydrolysis reaction. However, the colloidal silicas produced by any known methods are available in the present invention, and methods for the production thereof are not particularly limited.

The alkali metal silicates include, for example, metasilicates ($M_2SiO_3$), orthosilicates ($M_4SiO_4$), disilicates ($M_2Si_2O_5$), trisilicates ($M_2Si_3O_7$) and sesquisilicates ($M_4Si_3O_{10}$) (wherein in these formulae, M represents an alkali metal such as lithium, sodium or potassium), of alkali metals; and water glass. Among the silicic acid compounds, preferred is colloidal silica from the viewpoint of obtaining good corrosion resistance.

(b) Aromatic Amine-Based Condensation Products

The aromatic amine-based condensation products used in the present invention are exemplified by:
(A) an aromatic amine compound condensation product,
(B) an alkali-treated product of the aromatic amine compound condensation product (A),
(C) a higher fatty acid-treated product or aromatic carboxylic acid-treated product of the aromatic amine compound condensation product (A), and
(D) an alkylation product, alkenylation product and aralkylation product of the aromatic amine compound condensation product (A). These compounds may be used singly or in combination of two or more.

The aromatic amine compound condensation product (A) used includes preferably one having a weight-average molecular weight in the range of 1,000 to 100,000 in terms of polystyrene when measured by gel permeation chromatography (GPC), and particularly 1,500 or 50,000 from the viewpoint of obtaining good corrosion resistance.

In the present invention, from the viewpoint of corrosion resistance, the following are preferably used:
(B) the alkali-treated product of an aromatic amine compound condensation product (A),
(C) the higher fatty acid-treated product or aromatic carboxylic acid-treated product of an aromatic amine compound condensation product (A), and
(D) the alkylation product, alkenylation product and aralkylation product of an aromatic amine compound condensation product (A).

Further from the viewpoint of humidity resistance and prevention of a base oil from separating and diffusing (bleeding), the following are preferably used:
(C) the higher fatty acid-treated product or aromatic carboxylic acid-treated product of an aromatic amine compound condensation product (A), and
(D) the alkylation product, alkenylation product and aralkylation product of an aromatic amine compound condensation product (A).

<(A) Aromatic amine compound condensation products>

The aromatic amine compound condensation products include, for example:
(1) a self-condensation product of an aromatic amine compound;
(2) a condensation product of an aromatic amine compound with an aromatic hydroxyl compound;
(3) a condensation product of an aromatic amine compound with an aromatic nitro compound; and
(4) a condensation product of an aromatic amine compound with a quinone compound.

The aromatic amine compounds are exemplified by aminobenzenes such as aniline, o-, m- or p-phenylenediamine, o-, m- or p-aminophenol, o-, m- or p-chloroaniline, p-aminobenzene, 2,4-diaminoazobenzene, p-aminoacetanilide, o-, m- or p-methylaniline, N,N-dimethyl-p-phenylenediamine, 4-chloro-o-phenylenediamine, 4-methoxy-o-phenylenediamine, 2-amono-4-chlorophenol, 2,3-diaminotoluene, 2,4-diaminophenol, o-, m-, or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aminoisophthalic acid, 4,6-diaminoisophthalic acid, 2,5- or 2,6-diaminoterephthalic acid, 3-, 4- or 5-aminosalicylic acid, 4-hydroxyanthranylic acid, o-, m-, or p-aminobenzenesulfonic acid, 2,3-, 2,4-, 2,5-, 2,6-, 3,4- or 3,5-diaminobenzenesulfonic acid, 2-amino-1-phenol-4-sulfonic acid, and 6-amino-4-chloro-1-phenol-2-sulfonic acid; diphenylamines such as 4-aminodiphenylamine, 2-aminodiphenylamine, 4,4'-diaminodiphenylamine, 4-amino-3'-methoxydiphenylamine, 4-amino-4'-hydroxydiphenylamine, 4-carboxydiphenylamine, 4-amino-4'-carboxydiphenylamine, 4-sulfodiphenylamine and 4-amino-4'-sulfodiphenylamine; and aminonaphthalenes such as α-naphthylamine, β-naphthylamine, 1,5-diaminonaphthalene, 1-amino-5-hydroxynaphthalene, 1,8-diaminonaphthalene, 2,3-diaminonaphthalene, 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4-naphthylenediamine-7-sulfonic acid, 1,5-naphthylenediamine-2-sulfonic acid, 1,5-naphthylenediamine-4-sulfonic acid, 1,6-naphthylenediamine-7-sulfonic acid, 1,6-naphthylenediamine-2-sulfonic acid, 1,6-naphthylenediamine-4-sulfonic acid, 1,8-naphthylenediamine-7-sulfonic acid, 1,8-naphthylenediamine-4-sulfonic acid, 1,8-naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ acid), 2-amino-5-naphthol-7-sulfonic acid (J acid) and 1-amino-8-naphthol-3,6-disulfonic acid (H acid).

The aromatic hydroxyl compounds are exemplified by phenols and phenol derivatives, such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

In addition thereto, the aromatic hydroxyl compounds are exemplified by naphthols and naphthol derivatives such as α-naphthol, β-naphthol, 1,3-, 1,4-, 1,5-, 2,3-, 2,6- or 2,7-dihydroxynaphthalene, 1-hydroxy-2-naphthoic acid and 3-hydroxy-2-naphthoic acid.

The aromatic nitro compounds are exemplified by nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

The quinone compounds include, for example, benzoquinones and derivatives thereof, such as o-, m- or p-benzoquinone, tolu-p-quinone, o-xylo-p-quinone, thymoquinone, 2-methoxybenzoquinone, gentisyl quinone, polyporic acid and ubiquinone-n; naphthoquinones and derivatives thereof, such as 6-methyl-1,4-naphthoquinone, 2-methyl-1,4-naphthoquinone, α-naphthoquinone, juglone, lawsone, plumbagin, alkannin, echinochrome A, vitamin $K_1$, vitamin $K_2$, shikonin, β,β'-dimethyl acrylshikonin, β-hydroxyisovaleroshikonin and teracrylshikonin; anthraquinones and derivatives thereof, such as tectoquinone, 3-hydroxy-2-methylanthraquinone, anthraquinone, 2-hydroxyanthraquinone, alizarin, xanthopurpurin, rubiadin, munjistin, crysophanic acid, carminic acid, kermesic acid and laccaic acid A; and phenanthrenequinones such as phenanthrenequinone.

In order to carry out the self-condensation reaction of an aromatic amine compound alone, the condensation reaction of an aromatic amine compound with an aromatic hydroxyl compound and the condensation reaction of an aromatic amine compound with an aromatic nitro compound, a mineral acid and a condensation catalyst are used. The mineral acids are exemplified by hydrochloric acid, nitric acid, hydrobromic acid, phosphoric acid and sulfuric acid. The condensation catalysts are preferably exemplified by permanganic acid and salts thereof, such as permanganic acid and potassium permanganate; chromic acid-related compounds, such as chromium trioxide, potassium dichromate and sodium chlorochromate; metal nitrates, such as silver nitrate and lead nitrate; halogens, such as iodine and bromine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, potassium iodate and sodium chlorate; metal salts, such as ferrous chloride, ferric chloride, copper sulfate, cuprous chloride, cupric chloride and lead acetate; ozone; and oxides, such as copper oxide, mercury oxide, cerium oxide, manganese dioxide and osmic acid. It is also effective to use hydrogen peroxide and ferrous chloride in combination.

The self-condensation reaction of an aromatic amine compound alone, the condensation reaction of an aromatic amine compound with an aromatic hydroxyl compound and the condensation reaction of an aromatic amine compound with an aromatic nitro compound may be carried out in the presence of a condensation catalyst at 100 to 350° C. for 2 to 100 hours.

The proportion of an aromatic amine compound and an aromatic hydroxyl compound or an aromatic nitro compound, which are used in the condensation reaction of an aromatic amine compound with an aromatic hydroxyl compound and the condensation reaction of an aromatic amine compound with an aromatic nitro compound, depends on the aromatic amine compound, aromatic hydroxyl compound and aromatic nitro compound and the catalyst used, the reaction time, the reaction temperature and so forth. Generally, it is preferable to use from 0.1 to 10 moles of the aromatic hydroxyl compound or the aromatic nitro compound per mole of the aromatic amine compound.

The condensation reaction of an aromatic amine compound with a quinone compound is carried out in an organic solvent medium, optionally in the presence of a condensation catalyst. The organic solvent medium preferably has a pH within the range of from 1 to 13.5 and a pH adjuster may be used without any particular limitations. Usable pH adjusters include various acidic compounds and alkali compounds. The acidic compounds are exemplified by phosphoric acid, sulfuric acid, phytic acid and acetic acid; and alkali compounds are exemplified by alkali metal compounds or ammonium compounds, such as LiOH, KOH, NaOH, $Na_2CO_3$, $Na_2SiO_3$, $Na_2HPO_4$ and $NH_4OH$; and organic amine compounds, such as ethylenediamine, monoethanolamine and triethanolamine.

As the medium for the condensation reaction, organic solvents exemplified by alcohols, ketones and esters, or mixed solvents of water and hydrophilic organic solvents miscible with water are preferred. Usable hydrophilic organic solvents include, for example, alcohols, such as methanol, ethanol and propanol; ketones, such as acetone and methyl ethyl ketone; and esters, such as methyl acetate and ethyl acetate.

The condensation catalyst may be optionally used which is exemplified by azo catalysts such as α,α'-azobisisobutylonitrile and α,α'-azobis-2,4-dimethylvaleronitrile; elementary or molecular halogens, such as iodine, bromine and chlorine; peroxides, such as hydrogen peroxide, sodium peroxide, benzoyl peroxide, perbenzoic acid and p-menthane hydroperoxide; oxygen acids or oxygen acid salts, such as iodic acid, periodic acid, potassium periodate and sodium perchlorate. Incidentally, since the quinone compound acts as a condensation catalyst, the condensation reaction of an aromatic amine compound and a quinone compound takes place even in the absence of a condensation catalyst.

The condensation reaction can be normally carried out at 20 to 200° C. for 0.5 to 100 hours.

The proportion of an aromatic amine compound and a quinone compound in the condensation reaction of the aromatic amine compound and the quinone compound depends on the sort of the aromatic amine compound, quinone compound and catalyst used, the reaction time and the reaction temperature. In the present invention, it is preferable to use from 0.1 to 10.0 mols of the quinone compound per mol of the aromatic amine compound.

<(B) Alkali-treated product of an aromatic amine compound condensation product (A)>

Component (B), the alkali-treated product of an aromatic amine compound condensation product (A) is prepared by treating the aromatic amine compound condensation product (A), which is obtained in the presence of an acidic catalyst or in an acidic medium, with an alkali.

The method for treating the aromatic amine compound condensation product with an alkali is carried out by first dispersing the aromatic amine compound condensation product in water to prepare a 0.1 to 50 wt. % aqueous dispersion of the aromatic amine compound condensation product. Then, to the resulting dispersion is added an inorganic alkaline compound such as NaOH, KOH, $Na_2CO_3$, $NH_4OH$ or $(NH_4)_2CO_3$ in an amount of 10 to 20 parts by weight per 100 parts by weight of the aromatic amine compound condensation product and the mixture thus obtained is heat-treated at 90 to 140° C. for 0.5 to 10 hours. The amount of the alkaline compound used is to be sufficient to neutralize the acidic compound used in the condensation reaction for production for of the aromatic amine compound condensation product.

<(C) Higher fatty acid-treated product or aromatic carboxylic acid-treated product of an aromatic amine compound condensation product (A)>

Component (C), the higher fatty acid-treated product or aromatic carboxylic acid-treated product of an aromatic amine compound condensation product (A) is prepared by treating the aromatic amine compound condensation product (A) and/or the above alkali-treated product (B) of an aromatic amine compound condensation product with a higher fatty acid, an alkali metal salt or ammonium salt thereof an aromatic carboxylic acid or an alkali metal salt or ammonium salt thereof (hereinafter, referred to as "fatty acid and the like."). The higher fatty acids include, for example, hodinic acid, palmitic acid, stearic acid, oleic acid or linolic acid. The aromatic carboxylic acids include, for example, tannic acid or shellac acid.

The method for treating the aromatic amine compound condensation product (A) with a fatty acid and the like is carried out by first mixing a fatty acid and the like in an amount of 5 to 1,000 parts by weight per 100 parts by weight of the aromatic amine compound condensation product (A) and/or (B) the alkali-treated product thereof (B). Then, the resulting mixture is heat-treated at a temperature slightly higher than the melting point of the fatty acid and the like used (about 40 to 250° C.). Further, after the treated product thus obtained is optionally washed with water, the treated product is charged into water to allow it to precipitate. Thus, the higher fatty acid-treated product or aromatic carboxylic acid-treated product (C) of an aromatic amine compound condensation product is produced.

Incidentally, a solvent such as dioxane, N,N-dimethylformamide, 1,3-dimethyl-2-imidazolidinone, N,N-dimethylacetamide and N-methyl-2-pyrrolidone is preferably used at the step of mixing (A) the aromatic amine compound condensation product and/or (B) the alkali-treated product thereof with the fatty acids and the like, since the solubility of the resulting mixture is increased and the treatment with a higher fatty acid or an aromatic carboxylic acid is more sufficiently carried out.

Among the higher fatty acid-treated product and the aromatic carboxylic acid-treated product exemplified above, preferred is the higher fatty acid-treated product.

<(D) Alkylat ion product, alkenylat ion product and aralkylat ion product of an aromatic amine compound condensation product (A)>

Component (D), the alkylation product, alkenylation product and aralkylation product of an aromatic amine compound condensation product (A) can be prepared by reacting the aromatic amine compound condensation product (A) and/or the alkali-treated product thereof (B) with an alkyl halide, alkenyl halide, aralkyl halide or a mixture thereof in an organic solvent.

The alkyl halide used includes, for example, n-propyl bromide, n-butyl chloride, n-butyl bromide, isobutyl bromide, 2-ethylhexyl bromide, n-octyl bromide, n-octyl chloride, dodecyl bromide, cetyl bromide, stearyl bromide and stearyl chloride.

The alkenyl halide includes, for example, allyl chloride, allyl bromide, isopropenyl chloride, isopropenyl bromide, oleyl chloride and oleyl bromide.

The aralkyl halide includes, for example, benzyl chloride, benzyl bromide, β-phenylethyl chloride, β-phenylethyl bromide, p-methylbenzyl chloride, p-methylbenzyl bromide, p-ethylbenzyl chloride, p-ethylbenzyl bromide, cinnamyl chloride, cinnamyl bromide, p-octylbenzyl chloride, p-octylbenzyl bromide, styryl chloride, styryl bromide, phenetyl chloride and phenetyl bromide.

The organic solvent used in the above reaction includes, for example, dioxane, N,N-dimethylformamide, dimethyl sulfoxide, dimethylaniline, dimethylbenzylimine, nitrobenzene, N,N-dimethylacetamide, 1,3-dimethyl-2-imidazolidinone and N-methyl-2-pyrrolidone.

The reaction temperature is generally in the range of 10 to 200° C. During dropwise-addition of a halide, however, preferably the reaction mixture is kept at a temperature of the boiling point of the solvent or less. After the dropwise-addition, preferably the reaction mixture is heated to a prescribed temperature for proceeding the reaction.

Although the reaction time can be made short by raising the reaction temperature, it generally ranges form 1 to 10 hours after the dropwise-addition of the halide.

Further, preferably an alkaline compound is used in the above reaction. The alkaline compound includes, for example, LiOH, KOH, NaOH, $Na_2CO_3$, $Na_2SiO_3$, $Na_2HPO_4$, $Li_2CO_3$, $K_2CO_3$ and $CaCO_3$.

Alkylation of the aromatic amine compound condensation product is carried out by first dispersing or dissolving the aromatic amine compound condensation product (A) and/or the alkali-treated product thereof (B) in said solvent to prepare a 0.01 to 20 wt. % dispersion or solution and then dropwise adding thereto the above halide in an amount of 10 to 300 parts by weight, preferably 50 to 150 parts by weight, per 100 parts by weight of the condensation product (A) and/or the alkali-treated product (B). Further, the alkali compound stated above is optionally added in an amount of 10 to 500 parts by weight, preferably 30 to 300 parts by weight, per 100 parts by weight of the condensation product (A) and/or the alkali-treated product (B). Generally in the case of adding the alkali compound, it is preferably added prior to the dropwise-addition of the halide. Thereafter, the reaction mixture is heated to a prescribed temperature and then reacted for a prescribed time. After the end of reaction, the resulting reaction mixture is cooled and charged into water to allow to precipitate and/or to disperse the reaction product, followed by filtering, washing with water, and drying. Thus, the alkylation product is produced.

In the present invention, the aromatic amine-based condensation product (b) is used in an amount of 1 to 1,000 parts by weight, preferably 10 to 500 parts by weight, more preferably 50 to 250 parts by weight, per 100 parts by weight of the silicic acid compound (a).

The rust prevention method of the present invention is carried out by coating a first rust preventive comprising (a) a silicic acid compound and (b) an aromatic amine-based condensation product on a Zn-based metallic coating to form a coating film, which is referred to as the first coating film when the second coating film is formed. The first rust preventive is generally used as a coating liquid containing a solvent.

The solvent used in the formation of the first coating film include, for example, aliphatic hydrocarbons such as hexane; aromatic hydrocarbons such as toluene, xylene, cyclohexanone and tetrahydrofuran; esters such as ethyl acetate and butyl acetate; ketones such as methyl isobutyl ketone; alcohols such as methanol, ethanol and propyl alcohol; formamides such as N,N-dimethylformamide and N,N-diethylformamide; acetamides such as N,N-dimethylacetamide and N,N-diethylacetamide; dioxane; N-methyl-2-pyrrolidone; 1,3-dimethyl-2-imidazolidinone; and isophorone. These organic solvents can be used as a mixture with water in an amount in the range of not injuring the effects of the present invention.

The total concentration of the aromatic amine-based condensation product (b) and the silicic acid compound (a) is preferably 0.1 to 25% by weight, more preferably 1 to 10% by weight, based on the total weight of the coating liquid.

The coating liquid used in the formation of the first coating film can be optionally added with other components as long as the effects of the invention are not impaired. For example, when (c) an inorganic acid and/or an organic acid is added to the coating liquid, the coating liquid can be improved in storage stability.

The inorganic acids includes preferably inorganic phosphoric acids such as phosphoric acid, pyrophosphoric acid and tripolyphosphoric acid.

The organic acid includes, for example, aromatic carboxylic acids such as benzoic acid, pentafluorobenzoic acid, gallic acid, salicylic acid, tannic acid, laccaic acid, abietic acid, shellac, rosin, 1,8-naphthaldehydic acid, naphthoylbenzoic acid, naphthoylformic acid, naphthoic acid, phthalic acid, naphthoxyacetic acid and naphthylglycolic acid; aliphatic carboxylic acids such as formic acid, acetic acid, gluconic acid, glycolic acid, oxalic acid, tartaric acid, citric acid and lactic acid; aromatic sulfonic acids such as toluenesulfonic acid, naphthylenediaminesulfonic acid, naphthylenediaminedisulfonic acid and naphtholsulfonic acid; aliphatic sulfonic acids such as methylsulfonic acid; and organic phosphoric acids such as lecithinic acid, phitic acid and nucleic acid. Among them, particularly preferred are aromatic carboxylic acids from the viewpoint of improving storage stability.

Component (c) is used in an amount of 1 to 500 parts by weight, preferably 10 to 250 parts by weight, per 100 parts by weight of (a) the silicic acid compound.

When (c) the inorganic acid and/or the organic acid is added to a coating liquid used in the formation of the first coating film, the total concentration of the components (a), (b) and (c) is preferably 0.1 to 25% by weight, more preferably 1 to 10% by weight.

The wet coating film obtained by application of the first coating liquid is dried generally at room temperature to the boiling point of a solvent used. The first coating film thus formed has preferably a thickness of 1 to 50 $\mu$m.

In a preferred embodiment of the present invention, a second coating film comprising (a) a silicic acid compound is further formed on the first coating film, which has been formed on a Zn-based metallic coating, by coating a second rust preventive comprising the silicic acid compound (a) (generally, the second rust preventive is used as a coating liquid containing a solvent) and drying the wet coating film thus obtained, thereby the rust proof effect being further more enhanced.

Second Coating Film

The silicic acid compound [component (a)] used in the formation of the second coating film is the same as used in the formation of the first coating film and is as exemplified above. Preferable silicic acid compounds are silicic acid esters, colloidal silica and alkali metal silicates, which are also as exemplified above. The silicic acid compounds can be used singly or in a combination of two or more thereof.

In the formation of the second coating film according to the present invention, from the viewpoint of further enhancing the rust proof effect, the above silicic acid compound (a) is preferably used together with:
(d) a phosphoric acid compound;
(e) an organic compound with a molecular weight of less than 1,000 and having at least one group selected from the group consisting of —OH, —COOH and —SO$_3$H groups; and/or
(f) an organic polymer having at least one group selected from the group consisting of —OH, —COOH and —SO$_3$H groups. Among them, preferred are components (e) and (f).

The phosphoric acid compound of component (d) is preferably exemplified by an inorganic phosphoric acid such as phosphoric acid, pyrophosphoric acid and polyphosphoric acid; and an organic phosphoric acid such as lecithinic acid, phytic acid and nucleic acid.

The organic compound with a molecular weight of less than 1,000 and having at least one group selected from the group consisting of —OH, —COOH and —SO$_3$H groups of component (e) are exemplified by (e-1) an aliphatic compound with a molecular weight of less than 1,000 having at least one group selected from the group consisting of —OH, —COOH and —SO$_3$H groups; and (e-2) an aromatic compound with a molecular weight of less than 1,000 having at least one group selected from the group consisting of —OH, —COOH and —SO$_3$H groups.

Component (e-1):

Examples of the aliphatic compound having at least one —OH group include glycerin, ethylene glycol, glycol methyl ether, trimethylene glycol and propylene glycol.

Examples of the aliphatic compound having at least one —COOH group include aspartic acid, fumaric acid, itaconic acid, succinic acid, oxaluric acid, propionic acid, 2-ketoglutaric acid, oxalsuccinic acid, glutamic acid, cis-aconitic acid, pyruvic acid, oleic acid, linoleic acid, lauric acid, myristic acid, palmitic acid, stearic acid, maleic acid, formic acid and acetic acid.

Examples of the aliphatic compound having at least one —SO$_3$H group include 2-butanesulfonic acid and methanesulfonic acid.

Examples of the aliphatic compound having both a —OH group and a —COOH group include malic acid, isocitric acid, citric acid, 2,3-dihydroxypropionic acid, γ-hydroxyisovaleric acid, tartaric acid, meso-tartaric acid, racemic tartaric acid, lactic acid and gluconic acid. They can be used singly or in a combination of two or more thereof.

Component (e-2):

Examples of the aromatic compound having at least one —OH group include phenol, hydroquinone, resorcinol, catechol, hydroxypyridine, hydroxycarbazole, hydroxyquinoline, pyrogallol, phloroglucin, hydroxyhydroquinone, naphthol, dihydroxynaphthalene, trihydroxynaphtalene, 1-naphthylcarbinol, naphthopurpurin and quercetin; and derivatives thereof obtained by substitution with, for example, an amino group, an alkyl group or a halogen atom, such as o-, m- or p-aminophenol, 2-amino-4-chlorophenol, p-chlorophenol, 2,5- ,2,6- or 3,5-dihydroxytoluene and pentafluorobenzoic acid.

Examples of the aromatic compound having at least one —COOH group include benzoic acid, o-, m- or p-phthalic acid, bisphenol-2-carboxylic acid, pyromelitic acid, naphthoic acid, naphthalene-1,2-dicarboxylic acid, naphthalic acid, naphthalene-1,4,5,8-tetracarboxylic acid, 3-α-naphthylacrylic acid, naphtylacetic acid, 1-naphthylmalonic acid, 1,8-naphthaldehydic acid, naphthoylformic acid, naphthoxyacetic acid, abietic acid and rosin.

Examples of the aromatic compound having at least one —SO$_3$H group include benzenesulfonic acid, p-toluenesulfonic acid, naphthalene-1-sulfonic acid, naphthalene-1,2-disulfonic acid, 1-naphthylamine-2-sulfonic acid, 2-naphthylamine-1-sulfonic acid, 1-naphthylamine-4-sulfonic acid, β-naphthylaminedisulfonic acid and naphthylenediaminesulfonic acid.

Examples of the aromatic compound having both the —OH group and the —COOH group include gallic acid, salicilic acid, tannic acid, m- or p-hydroxybenzoic acid, 2,4-, 2,5-, 3,4- or 3,5-dihydroxybenzoic acid, 1-hydroxy-2-naphthoic acid, 3-hydroxy-2-naphthoic acid, α-naphthylglycolic acid, β-naphthylglycolic acid, pinselic acid and laccaic acid.

Examples of the aromatic compound having both the —OH group and the —SO$_3$H group include phenolsulfonic acid, phenoldisulfonic acid, naphtholsulfonic acid, naphtholdisulfonic acid and naphtholtrisulfonic acid.

The organic polymers having at least one group selected from the group consisting of —OH, —COOH and —SO$_3$H groups of Component (f) include, for example, polyvinyl alcohol, polyvinyl butyral, polyacrylic acid, phenol resin, carboxyl-modified phenol resin, polyvinylphenol, p-vinylphenol/2-hydroxyethyl methacrylate copolymer, brominated poly-p-vinylphenol, p-vinylphenol/styrene copolymer, p-vinylphenol/butyl acrylate copolymer, pectin, shellac, alginic acid, starch, chitin, chitosan, polyvinylsulfonic acid, polystyrenesulfonic acid, polyvinyl acetal, polyester resin, alkyd resin, urethane resin, polyalkylene glycol and vinyl acetate/vinyl alcohol copolymer.

In the formation of the second coating film, where component (a) is used in combination with at least one component selected from the group consisting of component (d), component (e) and component (f), said at least one compound is used in an amount of preferably 1 to 1,000 parts by weight, more preferably 10 to 500 parts by weight, per 100 parts by weight of component (a) used in the second coating film.

The solvent used in the formation of the second coating film includes organic solvents, for example, aliphatic hydrocarbons such as hexane; aromatic hydrocarbons such as toluene, xylene, cyclohexanone and tetrahydrofuran; esters such as ethyl acetate and butyl acetate; ketones such as methyl isobutyl ketone; alcohols such as methanol, ethanol and propyl alcohol; formamides such as N,N-dimethylformamide and N,N-diethylformamide; acetamides such as N,N-dimethylacetamide and N,N-diethylacetamide; dioxane; N-methyl-2-pyrrolidone; 1,3-dimethyl-2-imidazolidinone; and isophorone; and water.

The total concentration of the components contained in the coating liquid for use in the formation of the second coating film is preferably 0.1 to 25% by weight, more preferably 1 to 10% by weight, based on the total weight of the coating liquid.

The wet coating film obtained by application of the second coating liquid is dried generally at room temperature to the boiling point of a solvent used. The second coating film thus formed has preferably a thickness of 1 to 50 μm.

In the present invention, additives such as dyes, pigments and surfactants can be optionally added to the first coating liquid and/or the second coating liquid.

As methods for applying these coating liquids, there can be used roll-coating, spray coating, dip-coating, shower-coating and electrodeposition although not particularly limited thereto.

Objects to undergo rust-proof treatment according to the present invention are Zn-based metallic coatings which have been generally formed on the surface of a base as mentioned later. The Zn-based metallic coatings can be formed, for example, by plating a base with Zn-based metal. The plating may be electroplating or electroless plating. The Zn-based metal may be metallic Zn or Zn-based alloy. The content of Zn in the Zn-based metal is generally 5 to 100% by weight. In the case of Zn-based alloy, the content of Zn is generally 5% by weight or larger, preferably ranges from 7 to 99.8% by weight, more preferably from 60 to 99.8% by weight, although not limited thereto. Objects, i.e., bases, to be plated may be comprised of a metal or a non-metal. The metal includes, for example, iron, nickel, cobalt, aluminum, tin and alloys of two or more thereof including fypically steels. The base is generally in the form of plate or sheet. The Zn-based alloys include typically Zn—Ni alloy, Zn—Fe alloy, Zn—Co alloy, Zn—Fe—Co alloy, Zn—Al alloy and Sn—Zn alloy.

EXAMPLES

In the following, coating liquids or experiments marked with * are those not meeting the requirements of the present invention.

Production of Condensation Products

Condensation products A-(1), A-(2), A-(3) and A-(4) were produced by the condensation reactions as mentioned below. In each example, the molecular weight of the condensation product obtained was measured in the following way.

Measurement of Molecular Weight

Weight-average molecular weight in terms of polystyrene was measured by gel permeation chromatography (GPC) under the following measurement conditions.

Columns:
  Guard column:
    Tradename: slim-pack GPC-800DP, manufactured by Shimadzu Corporation.
  Analytical columns:
    Tradename: slim-pack GPC-803D, 802D, manufactured by Shimadzu Corporation.
Mobile phase: 10 mM LiBr/DMF
Flow rate: 1.0 ml/min
Detector: RI
Temperature: 60° C.

Further, alkali-treated products B-(1) and B-(3), and higher aliphatic fatty acid-treated products C-(1) and C-(3) were produced using the condensation products A-(1) and A-(3) obtained, and an aralkylation product D-(3) was produced using the alkali-treated product B-(3) obtained.

Production of Condensation Product A-(1)

Into a pressure resistant reaction vessel, 100 moles (10.9 kg) of p-aminophenol and 0.99 kg (9.5 moles as HCl) of 30% hydrochloric acid were charged, and the temperature of the resulting mixture was raised to 169° C. When the temperature reached 169° C., 18 liters of xylene was slowly added for the purpose of removing the water generated during condensation reaction as an azeotropic mixture. Then, the temperature of the reaction mixture was raised to 222° C. and reacted at this temperature for 3 hours. The mixed vapor of xylene and water generated during reaction was removed and the internal pressure was kept at 150 kPa. After reacting for 3 hours, the reaction mixture was cooled. The reaction product obtained was solid. Next, the reaction product was pulverized into fine particles, followed by washing with water, filtering and drying to obtain Condensation Product A-(1). This condensation product had a weight-average molecular weight of 2,500.

Production of Condensation Product A-(2)

Into a pressure resistant reaction vessel, 100 moles (10.8 kg) of m-phenylenediamine, 200 moles (22.0 kg) of resorcinol and 1.04 kg (10 moles as HCl) of 35% hydrochloric acid were charged, and the temperature of the resulting mixture was raised to 305° C. Immediately when the temperature of the mixture in the reaction vessel reached 305° C., the reaction mixture was cooled. The water produced during the rise in temperature and the reaction was removed, and the internal pressure was kept at 150 kPa. After cooling, a condensation product of m-phenylenediamine was obtained, which was pulverized to obtain as Condensation Product A-(2). This condensation product had a weight-average molecular weight of 3,000.

Production of Condensation Product A-(3)

A mixture of 100 moles of aniline, 31 moles of hydrochloric acid, 22.7 moles of nitrobenzene and 0.103 mole of ferric chloride was heated at 60° C. for 6 hours in a reaction vessel. Then, the temperature was raised to 180 to 185° C. to react the mixture at the temperature for 15 hours while water was evaporated off. During the reaction, a part of aniline and a part of nitrobenzene together with the water were evaporated off. The evaporated aniline and nitrobenzene were recovered and recycled to the reaction vessel. Next, the internal pressure was further raised to 200° C. and the reaction mixture was heated at this temperature for 5 hours.

The thus obtained reaction mixture in a melted form was charged into a dilute hydrochloric acid and heated to 60° C. for 3 hours, followed by hot-filtering to remove unreacted aniline. The reaction mixture was further washed 5 to 6 times with water in order to remove excess hydrochloric acid and then dried to obtain Condensation Product A-(3). This condensation product had a weight-average molecular weight of 15,000.

Production of Condensation Product A-(4)

Into a pressure resistant reaction vessel, 30,000 moles (960 kg) of methanol, 100 moles (15.8 kg) of 1,8-diaminonaphthalene, 50 moles (5.4 kg) of p-benzoquinone were charged. To the resulting mixture, 159 moles (20 kg) of pyrogallol was added and reacted at 60° C. for 20 hours. Then, 1,000 kg of water was charged into the reaction mixture and the resulting condensate was settled. The sediment thus obtained was filtered, washed and dried to obtain Condensation Product A-(4). This condensation product had a weight-average molecular weight of 12,000.

Production of Condensation Product B-(1) (Alkali-treated Product)

In 5.0 kg of water, 1.0 kg of the above Condensation Product A-(1) was dispersed and 0.1 kg of NaOH was added thereto. Thereafter, the resulting mixture was heated up to 130° C. and heat-treated at this temperature for 2 hours. After cooling, the liquid reaction product was filtered, washed with water, and dried to obtain Alkali-treated Product B-(1).

Production of Condensation Product B-(3) (Alkali-treated Product)

In 5.0 kg of water, 1.0 kg of the above Condensation Product A-(3) was dispersed and 0.2 kg of NaOH was added thereto. Thereafter, the resulting mixture was heated up to 100° C. and heat-treated at this temperature for 4 hours. After cooling, the reaction product was filtered, washed with water, and dried to obtain Alkali-treated Product B-(3).

Production of Condensation Product C-(1) (Higher fatty acid-treated Product)

To 1.0 kg of the above Condensation Product A-(1), 1.0 kg of lithium stearate was added. The resulting mixture was heated up to 230° C. and treated at this temperature for 1 hour. After cooling, the reaction product obtained was pulverized into fine particles, followed by washing with water, filtering and drying to obtain Higher fatty acid-treated Product C-(1).

Production of Condensation Product C-(3) (Higher fatty acid-treated Product)

To 0.5 kg of the above Condensation Product A-(3), 1.0 kg of oleic acid was added. The resulting mixture was heated up to 100° C. and treated at this temperature for 2 hours. After cooling, the reaction product was pulverized into fine particles, to obtain Higher fatty acid-treated Product C-(3) in the form of fine particles.

Production of Condensation Product D-(3) (Aralkylation Product)

Into a reaction vessel provided with a stirrer, a dropping funnel, a condenser, etc., 1.0 kg of the above Alkali-treated Product B-(3) was charged and then 10 kg of dimethylformamide was charged, and subsequently stirring was started.

Next, after adding 1.0 kg of anhydrous potassium carbonate as an alkali agent, the resulting mixture was heated up to 80° C. and kept at this temperature. To the mixture, 250 g of benzyl chloride was dropwise added over 2 hours, and stirring was kept at 80° C. for 1 hour.

Then, the reaction mixture was heated up to 120° C. and stirred at this temperature for 2 hours, followed by cooling. The reaction mixture was charged into 90 liters of water. After the resulting mixture was stirred for 1 hour, it was filtered, washed with water, and dried to obtain Aralkylation Product D-(3).

Preparation of Coating Liquid Nos. 1 to 9

As shown in Table 1, after 10 g of the aromatic amine-based condensation product was added to 475 g of tetrahydrofuran, 10 g (as a solid matter of $SiO_2$) of a colloidal silica having an average particle diameter of 10 to 20 nm (trade name: MA-ST, produced by Nissan Kagaku Kogyo K.K) as silicic acid compound and subsequently 5 g of benzoic acid as an organic acid were added thereto, followed by stirring and mixing for 1 hour to prepare coating liquid Nos. 1 to 9.

Preparation of Coating Liquid Nos. 10 to 14

As shown in Table 1, at least one component selected from a silicic compound (a), an aromatic amine-based condensation product (b), and a phosphoric acid or organic acid (c) was added to a solvent so that the total concentration of (a)+(b)+(c) was a value shown in this table, followed by stirring and mixing at about 25° C. for 1 hour to prepare coating liquid Nos. 10 to 14. Among them, coating liquid No.13* isacomparative example not using an aromatic amine-based condensation product (b), and coating liquid No. 14* is a comparative example not using a silicic acid compound (a).

Incidentally, the silicic acid compound used in experiment Nos. 10 to 13 is a colloidal silica having an average particle diameter of 10 to 20 nm (trade name: IPA-ST, produced by Nissan Kagaku Kogyo K.K)

TABLE 1

| Coating liquid No. | (a) Silicic acid compound | (b) Aromatic amine-based condensation product | (c) Inorganic phosphoric acid or organic acid | (a)/(b)/(c) (wt. ratio) | Total concentration of (a) + (b) + (c) (wt. %) | Solvent |
|---|---|---|---|---|---|---|
| 1 | MA-ST | A-(1) | Benzoic acid | 100/100/50 | 5.0 | Tetrahydrofuran |
| 2 | MA-ST | A-(2) | Benzoic acid | 100/100/50 | 5.0 | Tetrahydrofuran |

TABLE 1-continued

| Coating liquid No. | (a) Silicic acid compound | (b) Aromatic amine-based condensation product | (c) Inorganic phosphoric acid or organic acid | (a)/(b)/(c) (wt. ratio) | Total concentration of (a) + (b) + (c) (wt. %) | Solvent |
|---|---|---|---|---|---|---|
| 3 | MA-ST | A-(3) | Benzoic acid | 100/100/50 | 5.0 | Tetrahydrofuran |
| 4 | MA-ST | A-(4) | Benzoic acid | 100/100/50 | 5.0 | Tetrahydrofuran |
| 5 | MA-ST | B-(1) | Benzoic acid | 100/100/50 | 5.0 | Tetrahydrofuran |
| 6 | MA-ST | B-(3) | Benzoic acid | 100/100/50 | 5.0 | Tetrahydrofuran |
| 7 | MA-ST | C-(1) | Benzoic acid | 100/100/50 | 5.0 | Tetrahydrofuran |
| 8 | MA-ST | C-(3) | Benzoic acid | 100/100/50 | 5.0 | Tetrahydrofuran |
| 9 | MA-ST | D-(3) | Benzoic acid | 100/100/50 | 5.0 | Tetrahydrofuran |
| 10 | IPA-ST | B-(3) | Abietic acid | 100/150/50 | 6.0 | N-methyl-2-pyrrolidone |
| 11 | IPA-ST | B-(3) | None | 100/100/0 | 5.0 | Tetrahydrofuran |
| 12 | IPA-ST | B-(3) | Phosphoric acid | 100/100/100 | 6.0 | Dioxane |
| 13* | IPA-ST | None | None | 100/0/0 | 2.5 | Tetrahydrofuran |
| 14* | None | B-(3) | None | 0/100/0 | 2.5 | Tetrahydrofuran |

Evaluation Test

As specimen steel plates, there were used rolled steel plates (SDCC-D) each measuring 150 mm×70 mm×0.8 mm of which surfaces have been electroplated with Zn(99.5 wt. %)—Fe(0.2 wt. %)—Co(0.3 wt. %) alloy. Fourteen specimen steel plates of this type were prepared. After each of them was dipped in and coated with each of the coating liquid Nos. 1 to 14 prepared as above, it was left to stand at 70° C. for 2 hours to dryness. Thus, there were prepared specimen steel plates on each of which a coating of a rust preventive has been formed. The specimen steel plates were used for the following tests. The results are shown in Table 2.

Evaluation of Appearance

The appearance of a specimen steel plate on which a coating has been formed was visually observed.

Corrosion Resistance Test

In accordance with JIS Z-2371, the salt spray test was carried out on a specimen steel plate on which said coating film has been formed. The specimen steel plate was visually observed every 24 hours, and the time (hour) until a white rust having an area of 5% or more of the entire surface area of the specimen steel plate was formed was measured.

Evaluation for Storage Stability

After the coating liquid Nos. 1 to 14 were prepared, 100 ml of each of them was charged into a 100 ml-test tube, and the test tube was left to stand at rest. The test tube was visually observed every 24 hours as to whether any sediment was produced therein, and the time (hour) taken until the sediment was produced was measured.

TABLE 2

| Experiment | Coating liquid No. | Corrosion resistance (hr) | Appearance | Storage stability (hr) |
|---|---|---|---|---|
| 1 | 1 | 48 or more | Black | 72 or more |
| 2 | 2 | 48 or more | Black | 72 or more |
| 3 | 3 | 48 or more | Black | 72 or more |
| 4 | 4 | 48 or more | Black tinged with violet | 72 or more |
| 5 | 5 | 48 or more | Black | 72 or more |
| 6 | 6 | 48 or more | Black | 72 or more |
| 7 | 7 | 48 or more | Black | 72 or more |
| 8 | 8 | 48 or more | Black | 72 or more |
| 9 | 9 | 48 or more | Black | 72 or more |
| 10 | 10 | 48 or more | Black | 72 or more |
| 11 | 11 | 48 or more | Black | 24 |
| 12 | 12 | 48 or more | Black | 48 |
| 13* | 13* | 24 | Colorless | 72 or more |
| 14* | 14* | 24 | Black | 72 or more |

Preparation Examples of Coating Liquids

Coating liquids used for the formation of coating films were prepared. Silicic acid compounds used in these examples are as listed in Table 7.

Preparation of First Coating Liquid Nos. 1 to 13

In each example, a silicic acid compound (a), an aromatic amine-based condensation product (b) and a solvent listed in Table 3 were mixed so that a weight ratio of (a)/(b) and the total cencentration of (a)+(b) were as listed in Table 3. The resulting mixture was stirred at about 25° C. for 2 hours to prepare first coating liquid Nos. 15 to 27.

Incidentally, the silicic acid compound used in coating liquid Nos. 15 to 23 was a colloidal silica having a particle diameter of 10 to 20 nm (trade name: MA-ST, produced by Nissan Kagaku Kogyo K.K.), and the silicic acid compound used in coating liquid Nos. 24 to 27 was a condensate of tetraethoxysilane (trade name: Ethyl Silicate-40, produced by Tama Kagaku Kogyo K.K.).

TABLE 3

| First coating liquid No. | (a) Silicic acid compound | (b) Aromatic amine-based condensation product | (a)/(b) (wt. ratio) | Total concentration of (a) + (b) (wt. %) | Solvent |
|---|---|---|---|---|---|
| 15 | MA-ST | A-(1) | 100/200 | 3 | Tetrahydrofuran |
| 16 | MA-ST | A-(2) | 100/200 | 3 | Tetrahydrofuran |
| 17 | MA-ST | A-(3) | 100/150 | 5 | Tetrahydrofuran |
| 18 | MA-ST | A-(4) | 100/150 | 5 | Tetrahydrofuran |
| 19 | MA-ST | B-(1) | 100/250 | 3.5 | Tetrahydrofuran |
| 20 | MA-ST | B-(3) | 100/200 | 3 | Tetrahydrofuran |
| 21 | MA-ST | C-(1) | 100/250 | 3.5 | Tetrahydrofuran |
| 22 | MA-ST | C-(3) | 100/200 | 3 | Tetrahydrofuran |
| 23 | MA-ST | D-(3) | 100/300 | 4 | Tetrahydrofuran |
| 24 | Ethyl silicate-40 | A-(3) | 100/400 | 5 | Methanol |
| 25 | Ethyl silicate-40 | B-(3) | 100/200 | 3 | N-methyl-2-pyrrolidone |
| 26 | Ethyl silicate-40 | C-(3) | 100/100 | 4 | Ethanol |
| 27 | Ethyl silicate-40 | D-(3) | 100/50 | 3 | Methyl isobutyl ketone |

Experiment Nos. 15 to 25

In each experiment, a specimen plate was dip-coated with each of the first coating liquids listed in Table 4 and then left to stand at 70° C. for 2 hours to dryness for forming a first coating film having a thickness as shown in Table 4. Thereafter, the specimen plate was left to stand in a room kept at about 25° C. for 1 hour for cooling. Next, a silicic acid compound (a), a phospholic acid compound (d) and a solvent listed in Table 4 were mixed so that a weight ratio of (a)/(d) and the total concentration of (a)+(d) were as given in Table 4 to prepare second coating liquids. Each of the second coating liquids was further dip-coated on the first coating film formed on each of a specimen plate on which the first coating film has been formed as above and left to stand at 70° C. for 2 hours to dryness for forming a second coating film having a thickness as shown in Table 4. Thus, a specimen plate on which two kinds of coating liquids were separately coated.

Incidentally, the specimen plates used in these experiments were rolled steel plates (SDCC-D) measuring 150 mm×70 mm×0.8 mm of which surfaces have been electroplated with Zn(99.5 wt. %)—Fe(0.2 wt. %)—Co(0.3 wt. %) alloy.

Corrosion Resistance Test

In accordance with the salt spray test defined in JIS Z-2371, the specimen plates thus obtained on which rust preventive coating films were visually observed every 24 hours and the time (hour) taken until a white rust is formed on an area of 5% or more of the entire surface area of the specimen plate was measured. The results are shown in Table 4. Incidentally, Experiment No.25* is a comparative example in which a second coating liquid alone was used.

Experiment Nos. 26 to 37

In each experiment, preparation of a specimen plate and corrosion resistance test were carried out in the same manner as in Experiment No.15 except that a first coating liquid and a second coatingliquid listed in Table5 were used. The results are shown in Table 5. Incidentally, in Table 5 are specifically indicated a silicic acid compound (a), an aliphatic or aromatic compound with a molecular weight of less than 1,000 having a —OH, —COOH and/or —SO$_3$H group (e), a weight ratio of (a)/(e), the total amount of (a)+(e) and a solvent used in the first coating liquids and the second coating liquids.

Among these experiments, Experiment No.37* is a comparative example in which only a second coating liquid was used.

Experiment Nos. 38 to 49

In each experiment, preparation of a specimen plate and corrosion resistance test were carried out in the same manner as in Experiment No.15 except that a first coating liquid and a second coating liquid listed in Table 6 were used. The results are shown in Table 6. Incidentally, in Table 6 are specifically described a silicic acid compound (a), an organic polymer having a —OH, —COOH and/or —SO$_3$H group (f), a weight ratio of (a)/(f), the total amount of (a)+(f) and a solvent used in the first coating liquids and the second coating liquids.

Among these experiments, Experiment No.49* is a comparative example in which only a second coating liquid was used.

TABLE 4

| Experiment No. | First coating liquid No. (Film thickness, μm) | Second coating liquid | | | | | |
|---|---|---|---|---|---|---|---|
| | | (a) Silicic acid compound | (d) Phosphoric acid compound | (a)/(d) (wt. Ratio) | Total concentration of (a) + (d) % (Film thickness, μm) | Solvent | Storage stability (hr) |
| 15 | 1(0.6) | a | — | 100/0 | 2(0.4) | Isopropyl alcohol | 120 |
| 16 | 3(1.0) | b | — | 100/0 | 4(0.8) | Tetrahydrofuran | 120 |

TABLE 4-continued

| Experiment No. | First coating liquid No. (Film thickness, μm) | Second coating liquid | | | | | | |
|---|---|---|---|---|---|---|---|---|
| | | (a) Silicic acid compound | (d) Phosphoric acid compound | (a)/(d) (wt. Ratio) | Total concentration of (a) + (d) % (Film thickness, μm) | Solvent | Storage stability (hr) | |
| 17 | 5(0.7) | Tetramethoxysilane | — | 100/0 | 6(1.2) | Methanol | 120 | |
| 18 | 7(0.7) | f | — | 100/0 | 1(0.2) | Water | 120 | |
| 19 | 1(1.0) | c | — | 100/0 | 3(0.6) | Metyl isobutyl ketone | 120 | |
| 20 | 13(0.6) | a | Phosphoric acid | 100/10 | 2.2 (0.5) | Ethanol | 144 | |
| 21 | 2(0.6) | d | Pyrophosphoric acid | 100/20 | 2.4 (0.5) | Methyl isobutyl ketone | 144 | |
| 22 | 4(1.0) | e | Polyphosphoric acid | 100/30 | 2.6 (0.6) | Water | 144 | |
| 23 | 6(0.6) | b | Phitic acid | 100/40 | 2.8 (0.6) | Isopropyl alcohol | 144 | |
| 24 | 8(0.6) | Tetraethoxysilane | Lecithinic acid | 100/50 | 1.5 (0.3) | Tetrahydrofuran | 120 | |
| 25* | None | a | Phosphoric acid | 100/10 | 2.2 (0.4) | Isopropyl alcohol | 24 | |

TABLE 5

| Experiment No. | First coating liquid No. (Film thickness, μm) | Second coating liquid | | | | | |
|---|---|---|---|---|---|---|---|
| | | (a) Silicic acid compound | (e) Aliphatic and aromatic compounds | (a)/(e) (wt. Ratio) | Total concentration of (a) + (e) (%) (Film thickness, μm) | Solvent | Storage stability (hr) |
| 26 | 2(0.6) | a | Ethylene glycol [Mw:62.07] | 100/20 | 6(1.2) | Isopropyl alcohol | 144 |
| 27 | 4(1.0) | g | Itaconic acid [Mw:130.10] | 100/20 | 6(1.2) | Isobutyl Alcohol | 144 |
| 28 | 6(0.6) | b | Methanesulfonic acid [Mw:96.11] | 100/10 | 5.5(1.1) | Ethanol | 144 |
| 29 | 8(0.6) | d | Lactic acid [Mw:90.08] | 100/30 | 2.6(0.5) | Ethanol | 144 |
| 30 | 10(1.0) | a | Hydroxycarbazole [Mw:183.21] | 100/100 | 5(1.0) | Methanol | 144 |
| 31 | 12(0.8) | b | Phloroglucin [Mw:126.10] | 100/100 | 5(1.0) | Isopropyl alcohol | 168 |
| 32 | 9(0.8) | g | Pentafluorobenzoic acid [Mw:212.08] | 100/50 | 3(0.6) | Ethanol | 168 |
| 33 | 11(0.6) | a | Benzoic acid [Mw:122.12] | 100/50 | 6(1.2) | Methyl ethyl ketone | 168 |
| 34 | 13(0.6) | f | p-toluenesulfonic acid [Mw:172.20] | 100/30 | 6.5(1.3) | Ethanol | 144 |
| 35 | 1(0.6) | c | Gallic acid [Mw:170.12] | 100/100 | 5(1.0) | Methyl isobutyl ketone | 144 |
| 36 | 3(1.0) | Tetraethoxysilane | Naphtholsulfonic acid [Mw:224.24] | 100/20 | 6(1.2) | Methanol | 120 |
| 37* | none | a | Gallic acid [Mw:170.12] | 100/100 | 5(1.0) | Methyl isobutyl ketone | 24 |

TABLE 6

| Experiment No. | First coating liquid No. (Film thickness, μm) | Second coating liquid | | | | | Storage stability (hr) |
|---|---|---|---|---|---|---|---|
| | | (a) Silicic acid compound | (f) Organic Polymer | (a)/(f) (wt. ratio) | Total concentration of (a) + (f) % (Film thickness, μm) | Solvent | |
| 38 | 1(0.6) | a | Polyvinyl butyral | 100/50 | 3(0.6) | Tetrahydrofuran | 144 |
| 39 | 3(1.0) | e | Polyvinyl alcohol | 100/100 | 5(1.0) | Water | 144 |
| 40 | 5(0.7) | a | Polyvinyl phenol | 100/50 | 4.5(0.9) | Methanol | 144 |
| 41 | 7(0.7) | c | Shellac | 100/100 | 5(1.0) | Ethanol | 144 |
| 42 | 9(0.8) | b | Polystyrenesulfonic acid | 100/30 | 6.5(1.3) | Methanol | 144 |
| 43 | 11(0.6) | d | Polyvinyl acetal | 100/50 | 3(0.6) | N-methyl-2-pyrrolidone | 144 |
| 44 | 13(0.6) | b | Polyester | 100/100 | 5(1.0) | Methyl isobutyl ketone | 144 |
| 45 | 2(0.6) | c | Phenol resin | 100/100 | 4(0.8) | Methyl ethyl ketone | 144 |
| 46 | 4(1.0) | g | Urethane resin | 100/50 | 3(0.6) | Dioxane | 144 |
| 47 | 6(0.6) | f | Polyacrylic acid | 100/50 | 3(0.6) | Methanol | 120 |
| 48 | 8(0.6) | b | Alkyd resin | 100/50 | 4.5(0.9) | N-methyl-2-pyrrolidone | 144 |
| 49* | None | a | Polyvinyl phenol | 100/50 | 4.5(0.9) | Methanol | 24 |

TABLE 7

| | Silicic acid compound | Particle diameter (nm) | Trade name | Maker |
|---|---|---|---|---|
| a | Colloidal silica | 20~30 | MA-ST-M | Nissan Kagaku Kogyo K.K. |
| b | Colloidal silica | 10~20 | IPA-ST | Nissan Kagaku Kogyo K.K. |
| c | Colloidal silica | 10~20 | MEK-ST | Nissan Kagaku Kogyo K.K. |
| d | Colloidal silica | 10~20 | MIBK-ST | Nissan Kagaku Kogyo K.K. |
| e | Colloidal silica | 40~100 (chain) | ST-UP | Nissan Kagaku Kogyo K.K. |
| f | Lithium silicate | — | Lithium silicate | Nissan Kagaku Kogyo K.K. |
| g | Condensate of tetraethoxysilane | — | Ethyl silicate-40 | Tama Kagaku Kogyo K.K. |

What is claimed is:

1. A method for preventing a Zn-based metallic coating formed on a base from rusting, which comprises forming a coating film comprising (a) a silicic acid compound and (b) an aromatic amine-based condensation product on the surface of the Zn-based metallic coating, wherein said aromatic amine-based condensation product is at least one condensation product selected from the group consisting of a self-condensation produt of an aromatic amine compound, a condensation product of an aromatic amine compound with an aromatic hydroxyl compound, a condensation product of an aromatic amine compound with an aromatic nitro compound, and a condensation product of an aromatic amine compound with a quinone compound.

2. The method of claim 1, wherein the silicic acid compound of component (a) is a member selected from the group consisting of silicic acid esters, colloidal silica, and alkali metal silicates.

3. The method of claim 1, wherein the aromatic amine-based condensation product of component (b) may be untreated or further treated to comprise at least one member selected from the group consisting of:

(A) the untreated aromatic amine-based condensation product, (B) an alkali-treated product of the aromatic amine compound condensation product (A), (C) a higher fatty-acid treated product or aromatic carboxylic acid-treated product of the aromatic amine compound condensation product (A), (D) an alkylation product, an alkenylation product and/or an aralkylation product of the aromatic amine compound condensation product (A).

4. The method of claim 1, wherein the aromatic amine-based condensation product of component (b) has a weight-average molecular weight in terms of polystyrene of 1,000 to 100,000.

5. The method of claim 1, wherein the content of component (b) in said coating film is 1 to 1,000 parts by weight per 100 parts by weight of component (a).

6. The method of claim 1, wherein said coating film further contains, as component (c), at least one acid selected from the group consisting of inorganic phosphoric acids and organic acids.

7. The method of claim 1, wherein a second coating film comprising (a) a silicic acid compound is further formed on the coating film comprising (a) a silicic acid compound and (b) an aromatic amine-based condensation product, as the first coating film.

8. The method of claim 7, wherein the second coating film further comprises:

(d) a phosphoric acid compound;

(e) an organic compound with a molecular weight of less than 1,000 having a group selected from the group consisting of —OH, —COOH and —SO$_3$H groups; and/or (f) an organic polymer having a group selected from the group consisting of —OH, —COOH and —SO$_3$H groups.

9. The method of claim 8, wherein component (e) comprises:

(e-1) an aliphatic compound with a molecular weight of less than 1,000 having a group selected from the group consisting of —OH, —COOH and —SO$_3$H groups; and/or (e-2) an aromatic compound with a molecular weight of less than 1,000 having a group selected from the group consisting of —OH, —COOH and —SO$_3$H groups.

10. The method of claim 7, wherein the content of the component selected from the group consisting of component (d), component (e) and component (f) in the second coating film is 1 to 1,000 parts by weight per 100 parts by weight of component (a) contained in the second coating film.

11. The method of claim 1, wherein the content of Zn in said Zn-based metallic coating is 5 to 100% by weight.

12. The method of claim 1, wherein said Zn-based metallic coating is comprised of a Zn-based alloy in which Zn accounts for 7 to 99.8% by weight and the remainder essentially consists of at least one metal selected from the group consisting of Ni, Fe, Co, Al and Sn.

13. The method of claim 1, wherein said Zn-based metallic coating has been formed by electroplating or electroless plating.

* * * * *